Nov. 1, 1960   J. E. KITTELBERGER ET AL   2,958,254
OPTICAL GAGING SYSTEM
Filed March 11, 1958   2 Sheets-Sheet 2
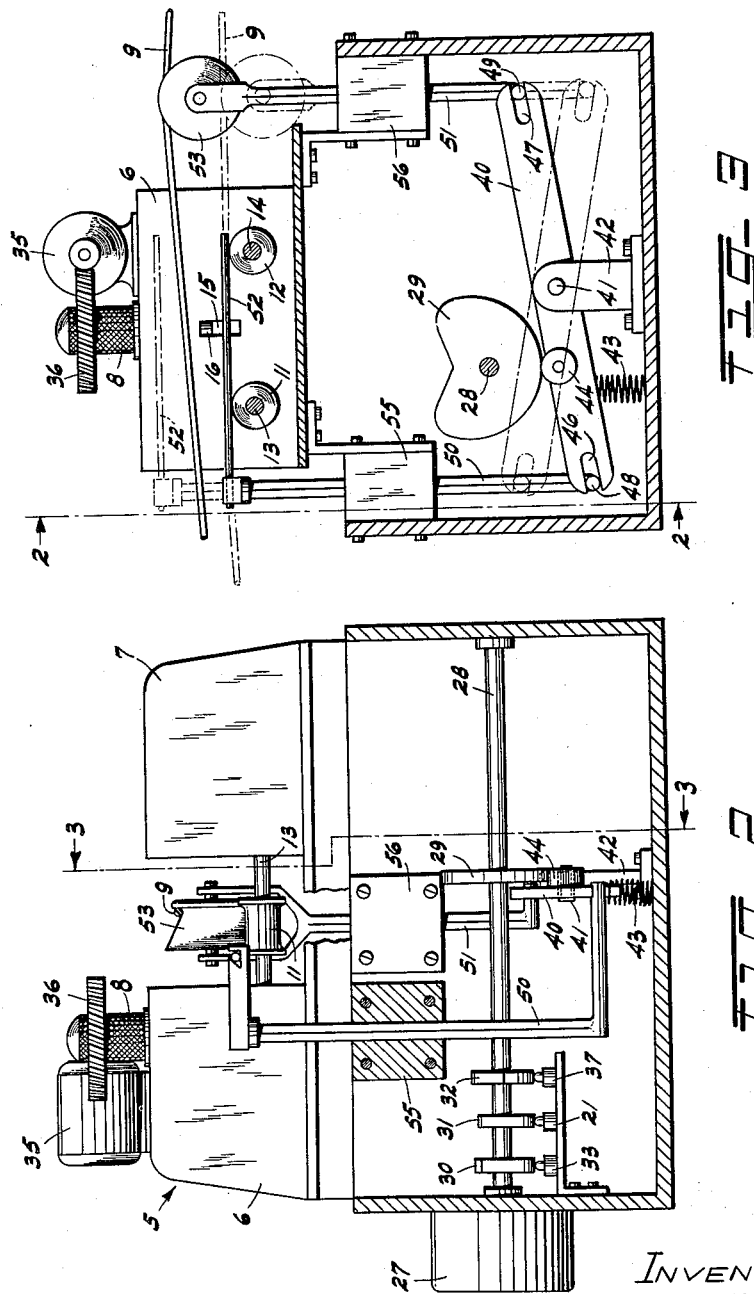
INVENTORS
J.E. KITTELBERGER
J.A. McELRATH
F. WAHL
By W.C. Parnell
ATTORNEY

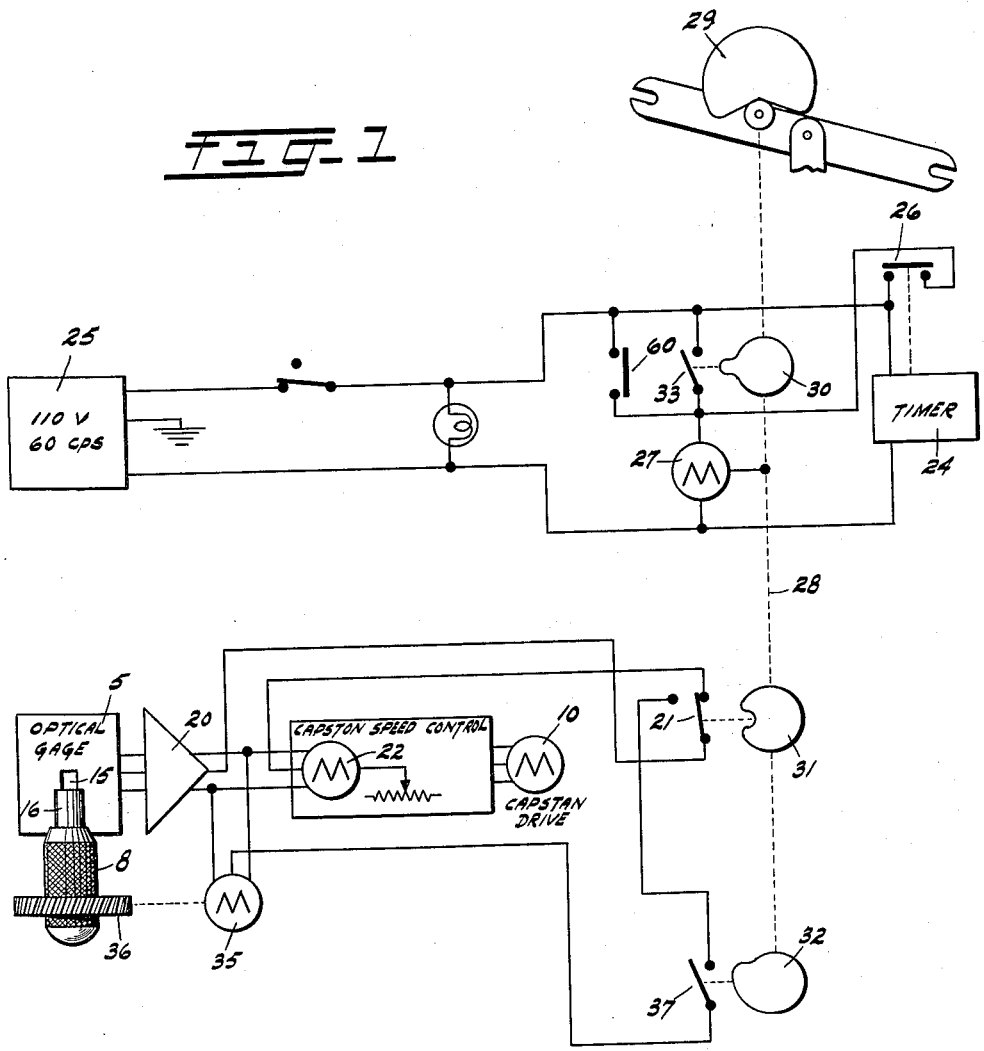

United States Patent Office 2,958,254
Patented Nov. 1, 1960

2,958,254

OPTICAL GAGING SYSTEM

James E. Kittelberger, East Orange, James P. McElrath, Pompton Lakes, and Frank Wahl, North Bergen, N.J., assignors to Western Electric Company, Incorporated, New York, N.Y., a corporation of New York Filed Mar. 11, 1958, Ser. No. 720,614

2 Claims. (Cl. 88—14)

This invention relates to an improvement in optical gaging systems in which the change in light transmitted to a photoelectric element is used to determine the variation in the size of an article. Particularly, it relates to an improvement for increasing the reliability of such systems.

Optical gaging systems are particularly well suited for making thickness or diameter measurements on articles which may be moving or where contact with the article is to be avoided. For example, one typical application for optical gages is found in the continuous measurement of the diameter of the plastic insulation on an advancing wire in an insulation extrusion line. In such a line a capstan continuously draws a bare wire through a plastic extruder and a water-filled cooling trough onto takeup reels. The wire is passed through the optical gage for continuously measuring the deviation of the diameter of the insulated wire from a desired value and its output directly varies the speed of the capstan to maintain the diameter substantially constant at the desired value. Thus, when the gage indicates that the diameter is larger than prescribed, the capstan is speeded up to thin out the extruded insulation on the wire, and when the diameter is smaller than prescribed, the capstan is slowed down.

Various factors may affect the calibration of optical gages such as, for example, the aging of electrical components and the changing gain of vacuum tubes. In addition, when used where there is appreciable dust or moisture in the atmosphere, the calibration may be thrown off by changes in the light transmission path to the photoelectric element resulting from such atmosphere. In the wire extrusion example, the occasional splashing of droplets of water from the advancing wire onto the optical system causes dirt and impurities to adhere thereto and obstruct the light beam through which the wire passes and which energizes the photosensitive element of the gage. Due to the reduction in transmitted light, the gage indicates a larger diameter than is actually passing through the gage and the capstan is speeded up in accordance with the erroneous indication. The resulting wire insulation then is smaller than is actually desired.

An object of this invention is to maintain the accuracy of optical gaging devices.

Another object is the automatic periodic recalibration of such gages which does not interrupt the process.

Still another object is to control the speed of a wire drawn through an extruder to produce a uniform insulation thickness thereon.

According to the general features of the invention, an article simulating member of known dimension is periodically substituted in the gage and the gage is recalibrated to the dimension of the member. In a preferred embodiment of the invention, an optical gage having an adjustable calibrating mechanism and an output circuit for producing a signal in proportion to the difference between a reference or calibrated value and an actual transverse dimension of an article located in the gage, is automatically recalibrated with an article simulating gaging member having a transverse dimension corresponding to the desired dimension. At predetermined intervals the operation of a sequencing mechanism is initiated to successively substitute the gaging member for the article, apply the output of the gage to a driver for automatically adjusting the calibrating mechanism so that the output of the gage will be calibrated to the gaging member and then disconnect the output of the gage from the driver and restore the gage to normal operation.

As applied to a wire insulating system wherein during normal operation bare wire is continuously drawn by a capstan through a plastic insulating extruder, the deviation in diameter of the insulation from a prescribed value is continuously measured as it passes through a calibrated optical gage and the output circuit of the gage directly controls means for varying the speed of the capstan to maintain the diameter of the insulated wire substantially constant. The means for automatically recalibrating the gage comprises a wire simulating gaging member such as a rod having a diameter equal to or bearing a known relation to the desired diameter. A timer having contacts operating at predetermined intervals initiates the operation of the sequence mechanism to successively cause the output circuit of the gage to be disconnected from the capstan controlling means, to substitute the gaging member for the moving wire in the gage, to connect the output circuit to a driving means for the calibration mechanism of the gage, and finally to restore the system to normal operation.

These and other features of the invention will be more fully understood from the following detailed description taken in conjunction with the accompanying drawing, in which:

Fig. 1 is a schematic diagram of a preferred embodiment of the invention as applied to a wire insulating line;

Fig. 2 is a side elevational view partially in section, as seen along the plane of line 2—2 of Fig. 3, disclosing the calibration adjusting means of the optical gage as well as a structure for substituting a gaging member for the moving wire in the gage; and Fig. 3 is a view of the device of Fig. 2 as seen along the plane of lines 3—3.

Referring now to the drawing, the optical gage 5 is of conventional design, being housed in two compartments 6 and 7, respectively, compartment 6 housing the photoelectric element, the output circuit and the adjustable micrometer calibrator 8. The wire 9, whose transverse dimension or diameter is monitored by the gage, is normally pulled through the gage by a capstan drive 10 over a pair of pulleys 11 and 12 supported between compartments 6 and 7 by shafts 13 and 14, respectively, so that the wire partially obstructs the light beam from the compartment 7 to the photoelectric element in compartment 6. The normal path of movement for the wire 9 is shown in dashed lines in Fig. 3. The light beam is transmitted through a slit 15 in compartment 6, as disclosed in Fig. 3. A light blocking element 16 of the calibrating micrometer 8 is moved by the micrometer to regulate the amount of light passing through the slit 15 and received by the photoelectric element.

The optical gage 5, like other conventional optical gages, has incorporated therein an output circuit for producing a potential which is proportional to the difference between a desired or reference light level and the light level resulting when an article, whose transverse dimension is to be monitored, partially blocks the light beam to the slit 15. Normally, the gage is calibrated by adjusting the micrometer 8 so that there is no voltage output from the gage when an article having the prescribed dimension is held in the gage. The output signal of the gage is such that it will drive a reversing or servo motor 22 an amount and in a direction corresponding to the relative diameters of the article in the gage and the reference dimension to which the gage is calibrated.

As seen in Fig. 1, under normal operation, the output of the gage 5 is applied through amplifier 20 and the normally closed contacts of switch 21 to the servo motor 22 controlling the capstan drive speed control. With this system, when the diameter of the insulated wire in the gage is greater than the prescribed value, the capstan drive will be speeded up until the desired diameter is produced and the output of the gage becomes zero. In similar fashion, when the diameter of the insulated wire in the gage is smaller than that prescribed, the capstan speed control is adjusted to slow down the capstan drive.

The automatic recalibrating sequence is periodically initiated when a timer 24, energized from a sixty-cycle-per-second source 25, times out and momentarily closes its contacts 26. The contacts 26 close an energizing circuit for motor 27 from the source 25. The motor 27 drives a cam shaft 28 for cams 29, 30, 31 and 32. As soon as the motor starts, it drives the cams from their normal positions, as seen in Fig. 1, and cam 30 thereupon closes its normally open switch 33 to complete a lock-up circuit for motor 27 so that its energizing circuit will remain closed until the cam shaft has been driven one complete revolution and cam 30 is returned to its starting position. This insures completion of the sequence of operations controlled by the cam shaft 28 independently of the time the contacts 26 of the timer remain closed. In a typical wire insulating system, the interval of operation as determined by the timer may be in the order of thirty minutes and the time to complete one revolution of the cam shaft may be in the order of one minute.

Cam 29 controls the substitution of a rod 52, having a diameter, equal to that prescribed for the insulated wire 9, in the gage. Cam 31 disconnects the output of the optical gage from the servo motor 22 by opening the common lead thereto so that the capstan speed control will be inoperative and the capstan drive will remain constant during the recalibration period. Cam 32 closes its switch 37 to connect the output of the optical gage to a servo motor 35 for driving a gear 36 on the micrometer 8 so that the calibration of the optical gage may be varied thereby. By routing this circuit through the back contacts of switch 21, interaction between the two motors 22 and 35 is avoided.

The structure for substituting the calibrating member in the gage is shown in Figs. 2 and 3 and comprises an actuator bar 40 pivoted at 41 of a fixed support 42. The actuator is rocked by the cam 29, a spring 43 exerting an upward force on the side of the pivot to hold a cam follower 44 on the actuator in constant contact with the cam 29. The cam 29 is heart-shaped and normally occupies the position shown in Fig. 1, that is, with the cam follower set within the recess of the cam. As the cam shaft 28 is rotated, the cam follower is forced out to the outer periphery of the cam, causing the left side of the actuator 40, as seen in Fig. 3, to be depressed and the right side thereof to be raised. Slide grooves 46 and 47 in opposite ends of the actuator 40 are provided for slidably receiving pins 48 and 49 of a pair of reciprocatable holders 50 and 51, respectively, for a calibrating drill rod 52 and a pulley 53. The rod 52 is of the desired diameter for the wire and when the cam 29 is moved to the position shown in Fig. 3, this rod is pulled down from its raised, "at rest" position, as shown by the dashed lines in Fig. 3, to a position in which it obstructs the light received in the light slit 15. At the same time this calibrating rod is moved into the light beam, the pulley 53 is raised from its lowered, "at rest" position, shown by the dashed lines, to engage and remove the advancing wire from its operating position in the optical gage. As seen in Fig. 3, the pulley 53 is provided with an offset groove so that when it engages the wire 9 the wire is moved to one side away from the path taken by the drill rod 52 when it is moved down into calibrating position. Slide blocks 55 and 56, having slots therein conforming to the cross-sectional configuration of the holders 50, are provided for restricting the motion of the holders 50 and 51 to reciprocating ones.

In the operation of the system, when the timer 24 times out and the contacts 26 thereof close, the sequencing motor 27 rotates the cam shaft 28 for a complete revolution during which the following sequential operations are performed: cam 31 opens the energizing circuit for the servo motor 22 controlling the capstan speed control; cam 29 is actuated to move the calibrating rod 52 into calibrating position and simultaneously lift the wire 9 from its normal path; cam 32 closes its switch 37 to connect the output of the optical gage to the servo motor 35 which, in turn, will drive the micrometer 8 until the output of the optical gage is nulled with this calibrating drill rod in position; cam 32 then re-opens the switch 37 to de-energize motor 35; cam 29 lifts the drill rod 52 and lowers the wire 9 to normal operating position; cam 31 recloses switch 21 to reconnect the output of the optical gage to the capstan speed control servo motor 22, and finally the cam shaft 28 is returned to its starting position where cam 30 disconnects energizing source 25 for motor 27. A manually controlled switch 60 permits initiating the recalibrating sequence in the event it is desired to recalibrate the gage independent of the timer.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a gaging system for continuously measuring the deviation of a transverse dimension of an advancing elongated element from a prescribed value and for producing a control signal corresponding to said deviation, the combination with a calibrated optical gage having an adjustable calibrating mechanism and an output circuit for producing a signal corresponding to the difference between a reference value corresponding to the prescribed dimension, and the actual measured dimension of an element normally passing through the gage along a given path, of means for automatically recalibrating the gage comprising an element-simulating gaging member having a transverse dimension corresponding to the prescribed dimension, a driver for the calibrating mechanism, a sequence mechanism, means for periodically actuating the sequence mechanism, a reciprocatable holder for the gaging member and a reciprocatable pulley having an offset groove thereon for engaging the moving element and moving it out of its normal advancing path, a pivoted actuator, means supporting the reciprocatable holder and pulley on the actuator on opposite sides of the pivot, a cam controlled by the sequence mechanism for rocking the actuator on its pivot, and means controlled by the sequence mechanism for successively rocking said actuator to substitute the gaging member for the advancing element in the gage, connecting the output circuit to the calibration mechanism driver, and then restoring the system to normal operation.

2. In a gaging system for continuously measuring the deviation of a transverse dimension of an advancing elongated element from a prescribed value and for producing a control signal corresponding to said deviation, the combination with a calibrated optical gage having an adjustable calibrating mechanism and an output circuit for producing a signal corresponding to the difference between a reference value corresponding to the prescribed dimension, and the actual measured dimension of an element normally passing through the gage along a given path, of means for automatically recalibrating the gage comprising an element-simulating gaging member having a transverse dimension corresponding to the prescribed dimension, a driver for the calibrating mechanism, a sequence mechanism, means for periodically actuating the sequence mechanism, a movable holder for the gaging member, a movable pulley for engaging and removing the advancing element from its normal path of movement, a pivoted actuator, means supporting the movable holder and pulley on the actuator on opposite sides of the pivot, means controlled by the sequence mechanism for rocking the actuator on its pivot, and means controlled by the sequence mechanism for successively substituting the gaging member for the advancing element in the gage, connecting the output circuit to the calibration mechanism driver and then restoring the system to normal operation.

References Cited in the file of this patent

UNITED STATES PATENTS

| | | |
|---|---|---|
| 2,369,858 | Ryan | Feb. 20, 1945 |
| 2,372,162 | Ryan | Mar. 20, 1945 |
| 2,415,174 | Hurley | Feb. 4, 1947 |
| 2,510,347 | Perkins | June 6, 1950 |
| 2,641,960 | Strother | June 16, 1953 |
| 2,694,335 | Albright et al. | Nov. 16, 1954 |
| 2,765,441 | Gambrill | Oct. 2, 1956 |
| 2,820,987 | Bunch | Jan. 28, 1958 |